Jan. 24, 1939.   E. H. CAWTHRA   2,145,040
METHOD OF AND MACHINE FOR MAKING CRAB JOINTS
Filed Jan. 19, 1938   6 Sheets-Sheet 1

INVENTOR
Ernest H. Cawthra
BY
ATTORNEY

Jan. 24, 1939.  E. H. CAWTHRA  2,145,040
METHOD OF AND MACHINE FOR MAKING CRAB JOINTS
Filed Jan. 19, 1938  6 Sheets—Sheet 2

INVENTOR
Ernest H. Cawthra
BY
ATTORNEY

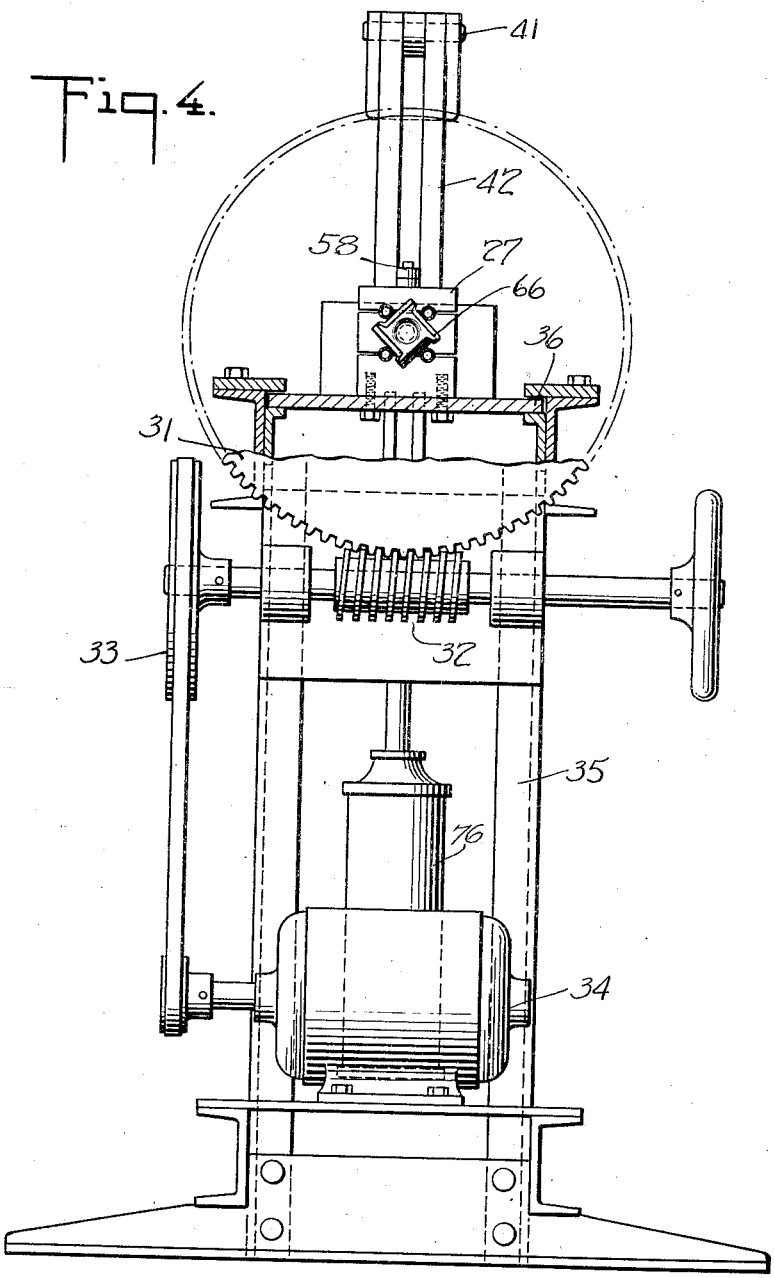

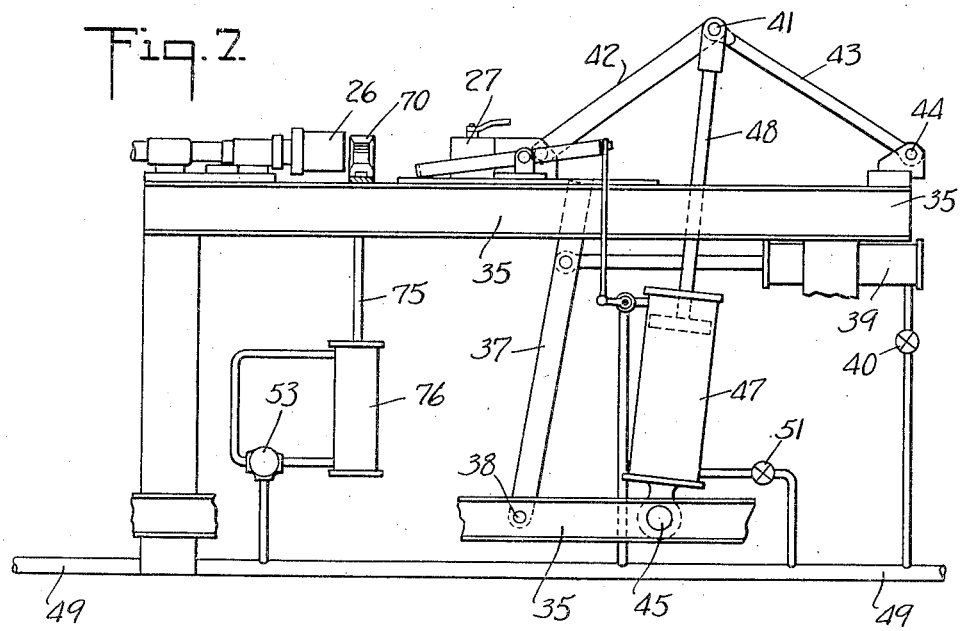
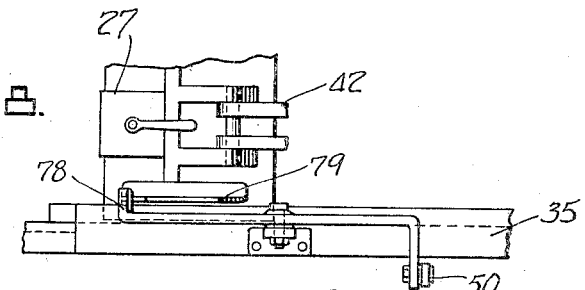
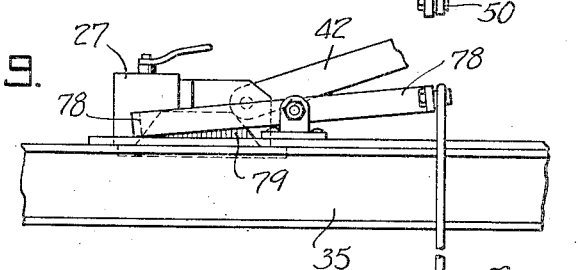
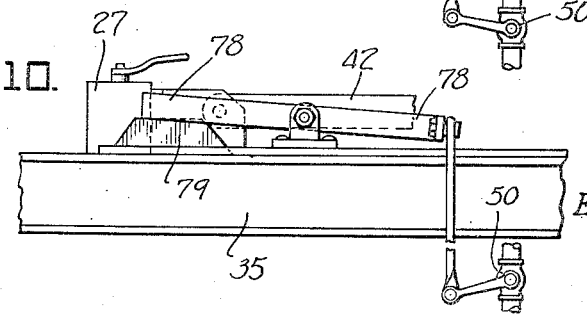

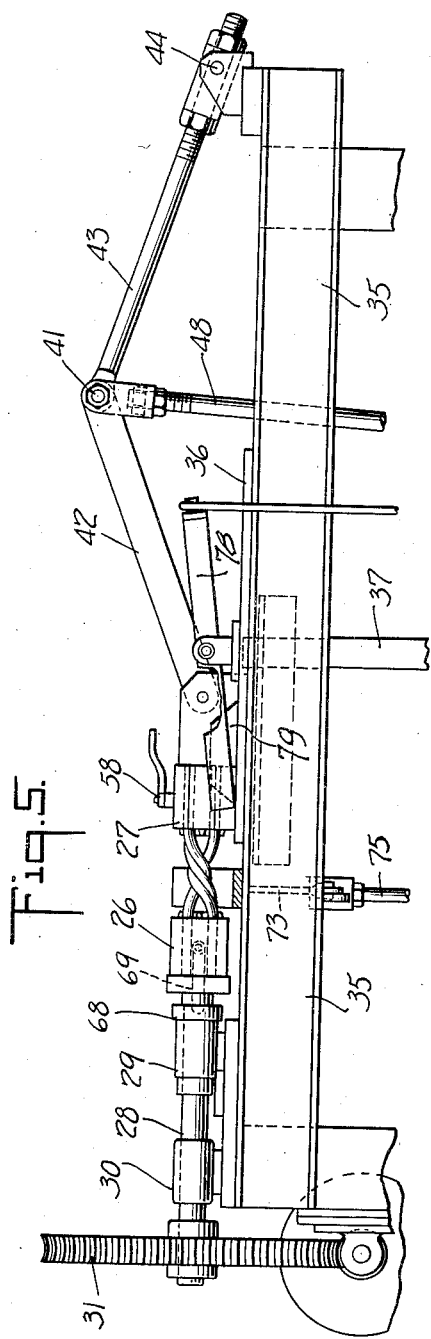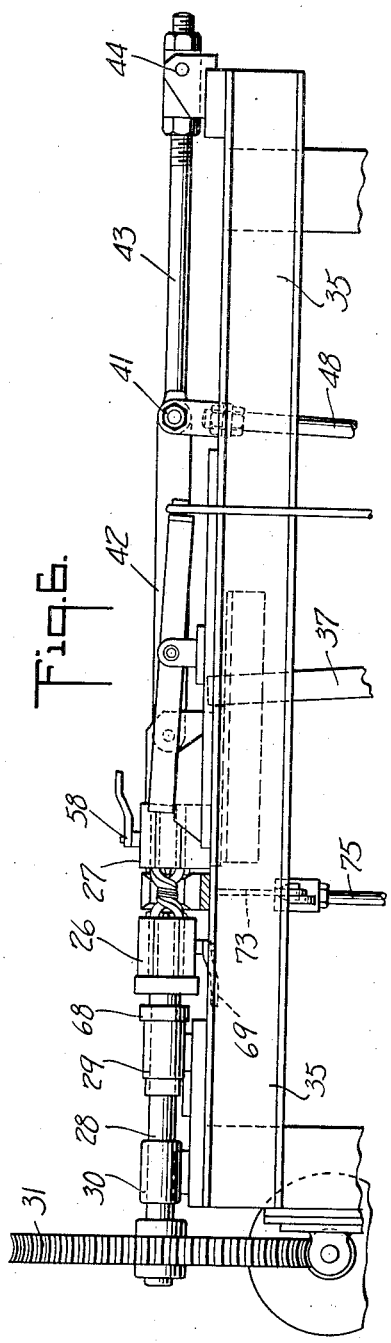

Jan. 24, 1939.  E. H. CAWTHRA  2,145,040
METHOD OF AND MACHINE FOR MAKING CRAB JOINTS
Filed Jan. 19, 1938   6 Sheets-Sheet 6
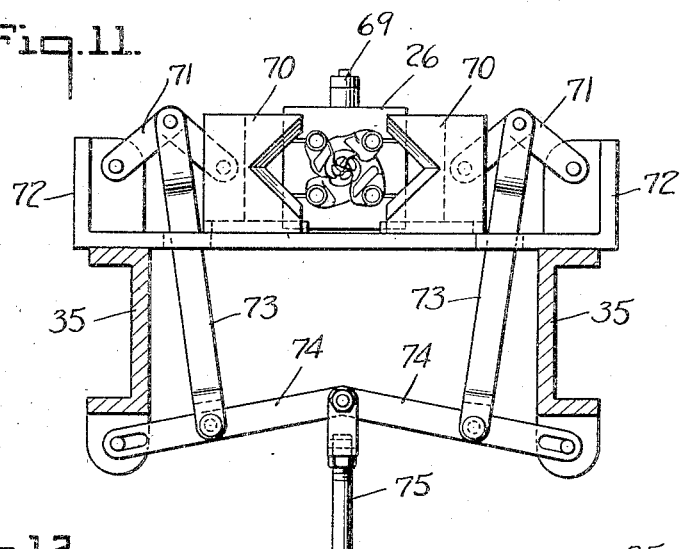
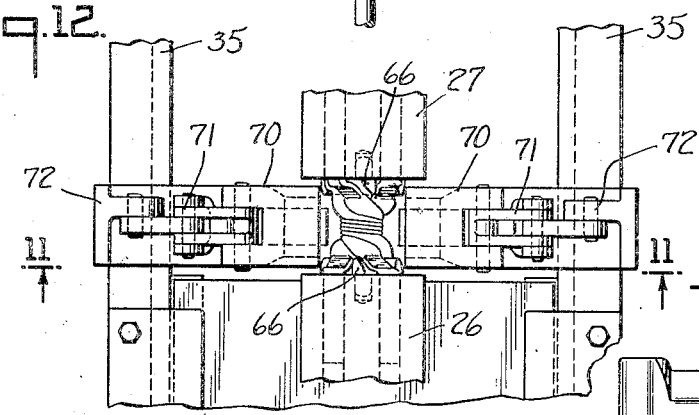
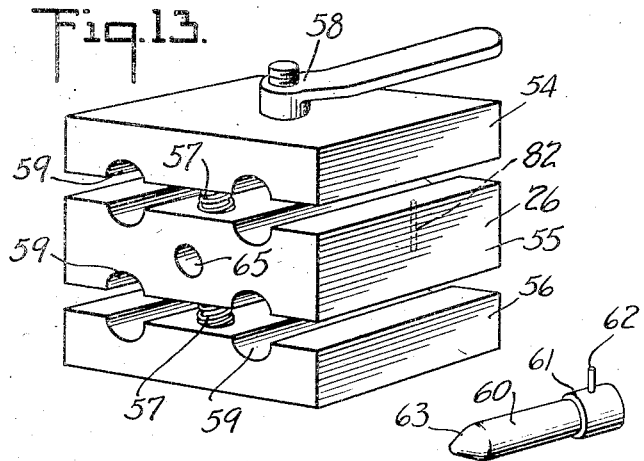
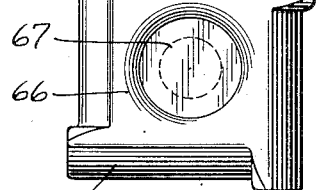
INVENTOR
Ernest H. Cawthra
BY
ATTORNEY Patented Jan. 24, 1939

2,145,040

UNITED STATES PATENT OFFICE 2,145,040

METHOD OF AND MACHINE FOR MAKING CRAB JOINTS

Ernest Hallewell Cawthra, Menlo Park, N. J., assignor to Phelps Dodge Copper Products Corporation, New York, N. Y., a corporation of Delaware Application January 19, 1938, Serial No. 185,781

18 Claims. (Cl. 153—78)

My invention relates to twisted tube crab joints for electric cables in net-work mains and the like, and has for its object the production of a new method of and machine for forming the twisted assembly, commonly known to the trade as twisted multiple connectors.

Crab joints have been made by twisting together a plurality of lengths of annealed seamless copper tubing so that the projecting ends may be used for connecting any number of cables together, such as two-way-two-way or four-way-four-way connector as shown. Heretofore when the tubes have been twisted in the manner common to the trade, it has been difficult to produce a neat central portion because of the difficulty of maintaining uniform compression resulting in the collapse of the tubes in the twisting and the convolutions would be not uniformly laid. It has also been difficult to make a rigid structure and when twisted too much, failure is apt to occur, causing a large percentage of spoilage due to fracture.

The manner of use of these crabs makes it necessary that the protruding end of the tubes be flexible so that they may be bent out from the center line of the structure and back to the original position many times without fracture of the tube's wall. In order to accomplish this it is desirable to specially form and shape the curved portion of the tube ends as they emerge from the twisted mass. One of the objects of this invention is to produce a method of making the crab that produces an exceptionally long curved portion joining the straight tubular ends with the twisted center portion and to so form it that an indefinite number of bends of this section outward and back can be made without fracture of the metal.

In making the crabs it is necessary to twist the assembled tubes under compression to form even convolutions and the twist movement must be synchronized with the compression movement. If the compression movement is not properly synchronized with the twist movement, the convolutions will be irregular and will not be properly closed. If the compression is too heavy, convolutions are also irregular and will be closed tightly before the twisting is completed, thereby causing a rupture of the metal. Another one of the objects of this invention therefore, is to produce a machine that will synchronize the twist and compression to form a perfect crab.

To keep the weight of the completed piece known as a crab, to a minimum, the twists must have the smallest possible number of rotating twists. I have discovered that with 1½ or 1¾ twists or substantially a twist of from 450° to 540° the convoluted or twisted portion may be compacted solid and no expansion and contraction of the cable connection under heat cycles will open or loosen the compacted mass of the crab connector.

My method and machine overcomes all these defects and produces a crab joint with uniform convolutions compacted into a solid mass, with the legs in perfect alignment, and provided with especially formed connecting portions rising out of the twisted center with a long unbroken curve that will permit the bending of the legs many times without rupture of the copper tubes.

This specially formed connecting portion between the tubular ends and the twisted portion is obtained by flattening the tube section in a plane which is at right angles to the diagonal line passing through the center lines of the diagonally opposite tubes, said plane being set at substantially 45° to the longitudinal axis of the tubes.

The foregoing and other features of my invention will now be described in connection with the accompanying drawings forming part of this specification in which I have illustrated my machine in its preferred form after which I shall point out in the claims those features which I believe to be new and of my own invention. In the drawings:

Figure 3 is a top view of same.

Figure 4 is an end view in part section along line 4—4, Figure 2.

Figure 5 is a side elevation similar to that shown in Figure 2 with the twisting head ¾ revolution, pressure on horizontal cylinder only. Toggle arm pressure not applied.

Figure 6 is a side elevation similar to that shown in Figure 2 with parts in final position. Full air pressure on both toggle press arms and carriage pull lever giving full twist and squeeze pressure.

Figure 7 is a diagrammatic sketch of the air control system, showing how the various air cylinders may be operated.

Figure 8 is an enlarged detail (side view) showing how the valve 50 is operated to give the final squeeze through the toggle.

Figure 9 is an elevation of parts shown in Figure 8.

Figure 10 is similar to Figure 9 with the valve handle raised, valve in operating position.

Figure 11 is a detail of the final clamping jaws and the means employed to operate them.

Figure 12 is a plan view of the clamping jaw as shown in Figure 11.

Figure 13 is an isometric view of one of my split chucks.

Figure 14 is a detail of the floating pins employed to prevent collapse of the tube ends.

Figures 15 and 16 are details of forming plug to finally shape the curvature of the lead to the extended arms.

Figure 1:
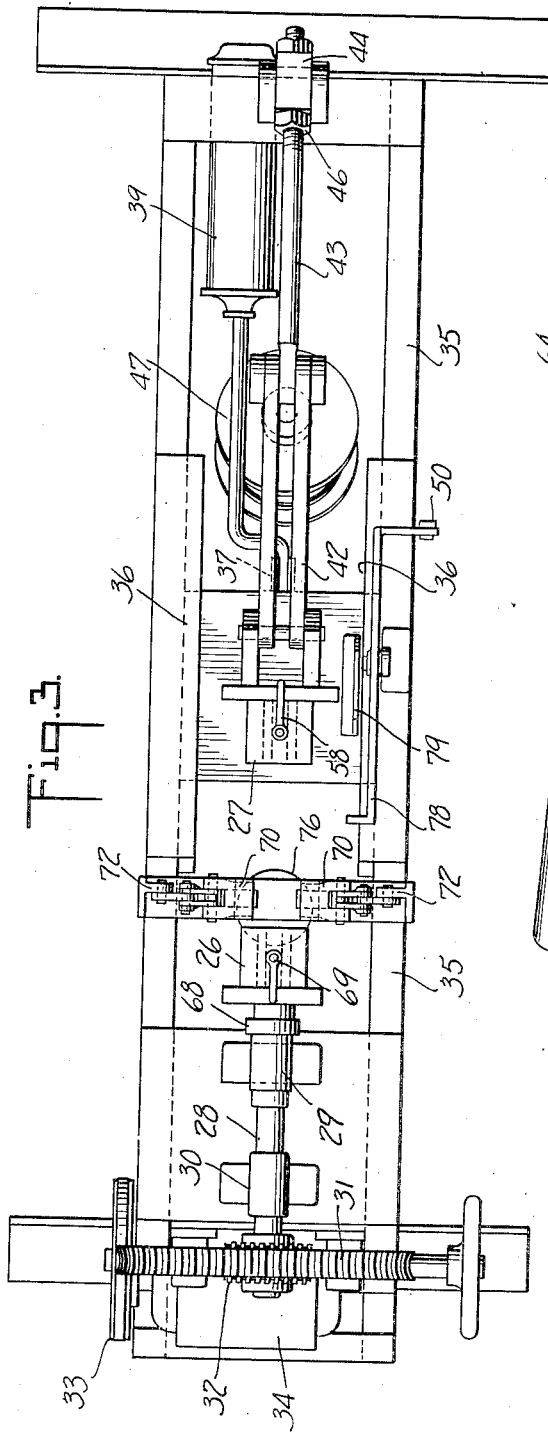
Figure 1 is an isometric view of a typical crab joint, a four-way-four-way, shown with eight legs made from four lengths of tubing.

In Figure 1, I show a view of a four-way-four-way crab joint made after the manner proposed by my method and more easily manufactured on my machine. While I show an eight leg crab, a crab with any number of legs may be made as will be readily understood, it being only necessary to vary the number of pieces of tubing.

To make the crab with the compressed member 20 having uniform twisted convolutions 21, uniform curved projections 22 and straight plane surface legs 23 in alignment on either side of the twisted compact portion, I assemble a plurality of annealed seamless copper tubes in geometrical and parallel relation about a common longitudinal axis, support the ends of the tubes against collapse and distortion, relatively twist the assembly about its longitudinal axis, while under longitudinal compression, the compression pressure increasing to overcome the resistance of the metal of the tubes against twisting, until the convolutions are properly formed and then, through a further turning of 90° by increasing the pressure to set and squeeze the twisted portion into a consolidated compact mass.

This method brings into action a relative motion between the twisting and sliding of the means to support the ends, to ensure a uniform twist and set to the finished product.

My method as described above can be carried out in many ways and I will now describe one of the preferred ways which I intend to employ.

I support the lengths of tubing in split chucks 26 and 27, adapted to be relatively turned around a common longitudinal center.

Chuck 26 is mounted on a revolving shaft 28 which turns in bearings 29 and 30 and through the gear 31, worm 32, pully 33 is driven by motor 34, all mounted on the main frame 35.

The chuck 27 is mounted to slide on frame 35 in guides 36 and is operated through lever 37 pivoted to frame 35 at 38 and moved by pressure in air cylinder 39. This pressure is constant at all times and shut off by manual operation of valve 40 (see Figure 7) operated by hand when loading the tubes into the chucks prior to making the crab.

Also connected to this chuck 27 is the toggle 41 and by levers 42 and 43 is connected to the frame 35 at 44. Adjustment of the length of the toggle joint is provided for, through the screw and nut 46. This toggle is operated by air cylinder 47 connected to the toggle 41 through rod 48 and to the main frame 35 at 45.

On the carriage of the sliding chuck 27, I provide a cam 79 (see Figures 8, 9, 10) which slides against lever 78 mounted on frame 35, which operates the air cylinder 47 to bring into action the toggle 41 to give the final squeeze to the crab.

While the chuck 26 is turning through an arc of approximately 450° the air cylinder 39 pushes the lever 37, moving the chuck 27 at speed synchronized with the formation of the twist, toward the revolving chuck 26 at which time the air cylinder 47 is put into action bringing into play the maximum squeeze, through the toggle action while the chuck 26 is turning another 90°.

I intend to operate the movements of the parts provided for the twist and squeeze by air pressure from a pressure source piped to the machine through the line 49. The horizontal cylinder 39 is operated by a valve 40 which is normally opened, with pressure in the cylinder 39 all the time, except for loading.

Cylinder 47 is piped with two valves 50 and 51. Valve 50 is operated by lever 78 upon the sliding chuck 27 arriving at a predetermined position so that the cam 79 mounted on the chuck carriage raises the lever 78 to open the valve 50. During this time valve 51 is closed.

Cylinder 76 is operated through a three-way valve 53 manually, to form the flat planes in the curved legs of the crab, during the time the pressure is on the toggle 41. This moves the jaws 70 toward each other and toward the faces 77 of the forming plug 66 carried in the face of the split chucks 26, 27.

In my present set up I use separate manual operation of the starter for the motor and the air control valve but these may be connected to a single control.

The split chuck 26 as shown in Figure 13 comprises three plates 54, 55, 56. Springs 57 are provided to separate the plates upon release of the clamping means 58. This means may be an ordinary screw and nut, as shown, or the equivalent cam action link.

In the recesses 59, I provide floating pins 60 provided with cylindrical heads 61 and pins 62 which engage holes 82 in plate 55 to keep the pins from withdrawing from the recesses 59 upon taking the crab out of the machine. Each pin 60 has a specially formed nose 63 which is shaped to the conformation 64 desired on the crab. (See Figures 13 and 14.) The function of the pins 60 is to keep the ends of the twisted tubes against collapse and to help shape the tubes at the point of joinder to the flat portion of the legs 23. It is readily apparent that the tubes are supported in the recesses 59 of the chuck with the pins 60 inside the tubes.

It will be noticed that part 55 of the split chuck is provided with a recess 65 adapted to engage and hold the forming plug 66. This plug has a central recess 67 in its face so as to provide a long length to the flattened portion 23 of the tube ends. (See Figure 1.) With this peculiar formation of the face of the plug 66 the metal of the twisted part is set up tight and compacted at the same time the maximum length of this leg is obtained. This conformation also gives a perfect ogee curve to the leg of the crab which increases materially the life of the crab.

I have discovered that the longer this length of curve, the more times the crab arm can be bent back and forth without fracture and for the purpose intended this is a valuable quality.

The chuck 26 is mounted on head 68 adapted to turn with shaft 28.

Chuck 27 is of similar split construction with floating pins 60 but it slides as heretofore described on the main frame 35.

While I have shown chuck 26 turning, with chuck 27 sliding, they both may turn and/or slide and I do not wish to limit myself to that particular construction shown. The important part is that the chucks turn relatively about a common axis and approach each other under synchronous movement and compress the crab center while turning.

I have discovered that there are two important factors which govern the operation in twisting up the tubes to form the crab. The pressure varies with the resistance of the tube against twisting and crushing and the movement of the chucks toward each other varies in proportion to the curve of the spiralling of the tubes.

To bring about ideal conditions with a constant twist of the turning head, one must have variable increasing compression movement. The same results may be obtained however, with a variable increasing twist of turning head and a constant compression movement.

Figure 2:
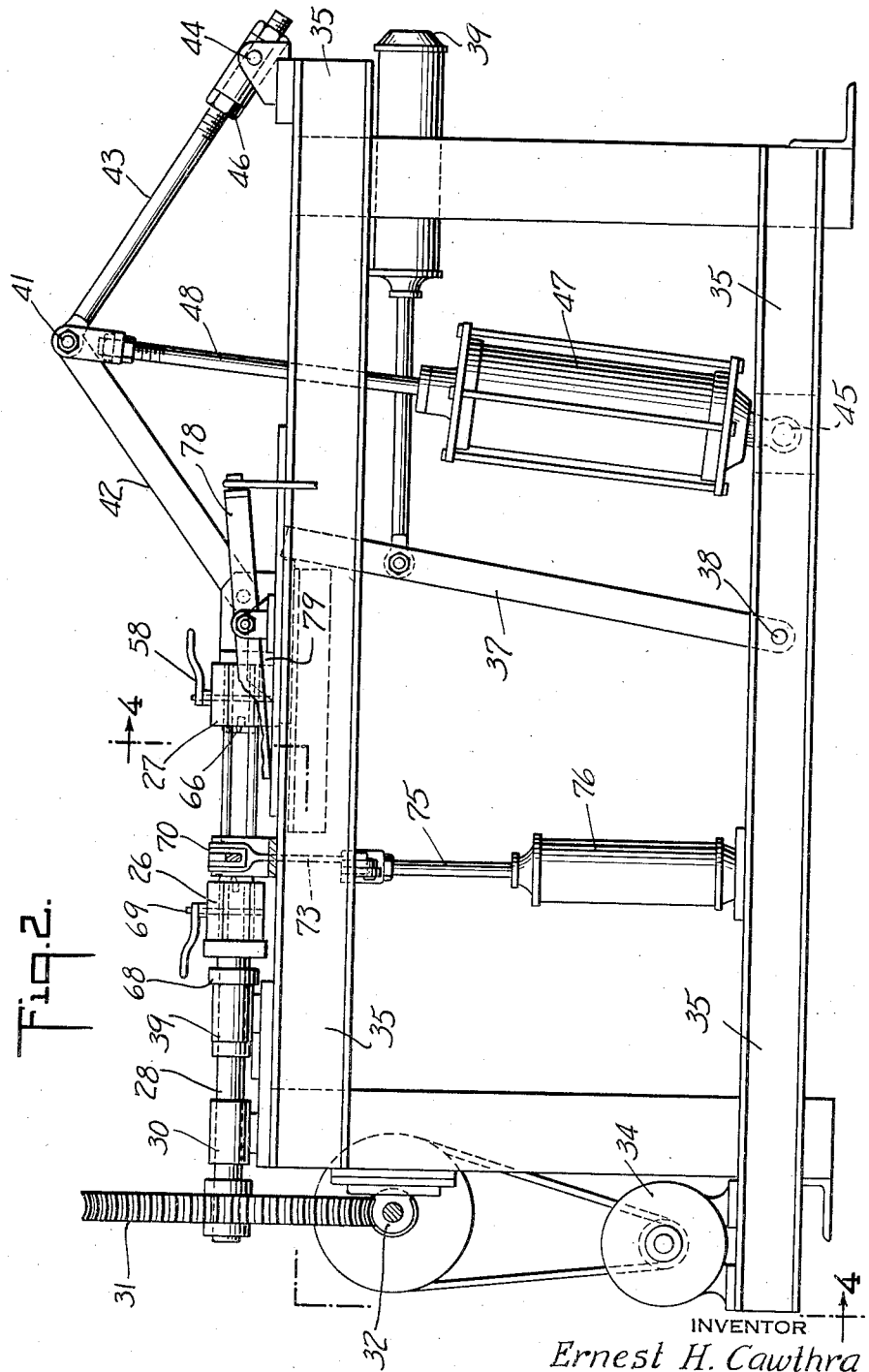
Figure 2 is a side elevation of my machine with the parts in loading position; the tubes are in the twisting head, reverse air pressure in all cylinders. The leg forming device and the air piping is removed to simplify this view.

To operate my machine the parts are set in the loading position shown in Figure 2, the tubes are inserted in the twisting head chuck 26 and clamped in position by the clamp lever 69. The air pressure is now in reverse in all cylinders, 39, 47 and 76 with the sliding chuck 27 at the extreme right position of slide, and the toggle joint 41 broken as shown.

The air is turned on in cylinder 39 which advances the sliding chuck 27 under pressure. When the tubes are in place in chuck 27 the clamping means 58 is tightened to rigidly support and hold the ends of the tube against rupture and collapse. The motor 34 is then started and the twisting head revolves the chuck 26 at the same time the horizontal cylinder 39 is advancing the sliding chuck 27 uniformly.

This synchronizing of the movement of the twist with the slide produces a uniform convolution in the twisted portion so that the wraps lie in uniform and tightly compressed manner. Upon the twisting head making 450° the convolutions have been properly laid to receive the final squeeze. This is brought about by the cam 79 on the sliding chuck 27 striking the lever 78 operating the valve 50 and bringing the cylinder 47 operating the toggle 41 into operation which materially increases the compression on the crab and brings about the final squeeze and set, at which time the motor 34 is stopped.

Mounted for operating transversely across the main frame 35, I provide two sliding jaws 70 connected through toggles 71 to supports 72 provided for the purpose on main frame 35. These toggles are linked together by linkage 73 and 74 to a rod 75 attached to the piston of an air cylinder 76.

The jaws 70 are shaped to give the final conformation to the crab and at the moment of the final squeeze the valve 53 is opened manually bringing the jaws of the chuck against the tubes and flattening the legs up against the flat surfaces 77 of the forming plug 66. These cooperating surfaces are so arranged that the flattened portion of the legs of the crab will be at right angles to a line passing through the center of the tubes and disposed at an angle of substantially 45° to said line.

I wish it distinctly understood that my machine for making tubular crab joints herein described and illustrated is in the form I desire to use it and that changes or variations may be made as may be convenient or desirable without departing from the salient features of my invention and I therefore intend the following claims to cover such modifications as naturally fall within the lines of invention.

I claim:
1. A method of making crab joints including the steps of assembling a plurality of metal tubes in a geometrical and parallel relation about a common longitudinal axis, rigidly supporting the ends of the tubes against collapse and distortion, twisting the assembly substantially 450° about the longitudinal axis while under longitudinal compression, said compression pressure increasing substantially proportionally to the resistance of the metal of the tubes against twisting, applying higher pressure through a further 90° twist to set and compact the convolutions of the twisted part between the projecting ends of the crab.

2. A method of making crab joints including the step of assembling a plurality of metal tubes in geometrical and parallel relation about a common longitudinal axis, rigidly supporting the ends thereof, twisting the assembly about its longitudinal axis substantially 450° while under slightly increasing longitudinal compression and finally twisting the assembly through another arc with increasingly high pressure to compress and set the assembly.

3. A method of making crab joints including the steps of assembling a plurality of metal tubes in geometrical and parallel relation about a common longitudinal axis, rigidly supporting the ends thereof against collapse, twisting the assembly about its longitudinal axis under longitudinal compression, gradually increasing the pressure to form twisted sections into preliminary shape with uniform convolutions and increasing the pressure sufficiently to close the convolutions thus formed.

4. The method of claim 1 including the flattening of the tubes where they emerge from the twisted portion.

5. The method of claim 1 including the forming of the final set with each leg of the crab, flattened at the curved portion where it joins the twisted portion, said flats forming a substantial square in their relation to one another.

6. In a machine for making twisted tube crab joints, in combination, means for supporting a plurality of lengths of tubing about a central axis and rigidly holding the ends against collapse, means for twisting the tubes thus assembled about the central axis while compressing the tubes along the axis, and means to compress and set the twisted section into a consolidated mass, means for forming the curved portion of the ends of the tubes in an easy ogee curve terminating in a flat mid-portion.

7. In a machine for making twisted tube crab joints, in combination, means for supporting a plurality of lengths of tubing about a central longitudinal axis and rigidly holding the ends against collapse, means for twisting the tubes thus assembled about the axis, means for compressing the tubes longitudinally, means for operating the twisting means and the compressing means synchronously whereby the convolutions of the twisted part will be regular and closed, and means to further compress the twisted portion thus formed into a compact mass.

8. The device of claim 7 including means to bring the final closing pressure into operation upon twisting 450° and to continue this pressure until the final closing of the center convolutions.

9. A method of making crab joints including the steps of assembling a plurality of metal tubes in a geometrical and parallel relation about a common longitudinal axis, supporting the ends of the tubes against collapse and distortion, twisting the assembly substantially 450° to 540° about the longitudinal axis with a variable increasing speed of twist and while under constant longitudinal compression, applying higher pressure through a further twist to set and compact the convolutions of the twisted part between the projecting ends of the crab.

10. In a machine for making twisted crab joints, in combination, a sliding chuck and a rotating chuck adapted to be relatively operated about a common longitudinal center, each chuck comprising plates arranged to be moved to and from each other and provided with recesses, floating pins adapted to be held within the recesses to form an annular space in each recess, means to turn the rotating chuck at a fixed speed, means to move the sliding chuck towards the rotating chuck under an increasing pressure.

11. The machine of claim 10 with the addition of means to increase the pressure at the end of the operation.

12. In a machine for making twisted crab joints, in combination, a sliding chuck and a rotating chuck adapted to be relatively operated about a common longitudinal center, each chuck comprising plates arranged to be moved to and from each other and provided with recesses, the recesses of the rotating chuck coaxial with the recesses with the sliding chuck, floating pins adapted to be held within the recesses to form an annular space in each recess, means to turn the rotating chuck at an increasing rotating speed, means to move the sliding chuck towards the rotating chuck under constant pressure.

13. The machine of claim 12 with the addition of means to increase the pressure at the end of the operation.

14. The machine of claim 12 with the addition of forming means mounted on each chuck to conform the emerging tube ends in a predetermined shape.

15. In a machine for making twisted tubular crab joints, comprising two chucks adapted to support a plurality of tubes in geometrical and parallel relation about a central axis, means to synchronously rotate one chuck and longitudinally move the other chuck, means carried by each chuck coaxial with the center line to form the end of the twisted portion of the joint in a predetermined shape.

16. The device of claim 15 with the addition of means in cooperation therewith for pressing the curved ends of the tubes against the shaping means to form the predetermined shape of the crab.

17. A method of making crab joints including the steps of twisting a plurality of tubes into a centrally twisted portion having the ends of the tubes disposed about a common center, collapsing the tubes at the point of joinder with the twisted portion in a plane at right angles to the plane passing through the center lines of the diagonally opposite tubes, said plane being set at substantially 45° to the longitudinal axis of the crab.

18. A method of making crab joints including the steps of twisting a plurality of separate tubes into a centrally twisted portion having the ends of the tubes disposed about a common center in spaced parallel relation, and collapsing the tubes at the point of joinder with the twisted portion to form a plane surface whereby the bending of the tube end outwardly and inwardly is facilitated.

ERNEST HALLEWELL CAWTHRA.